(12) United States Patent
Meffert et al.

(10) Patent No.: US 7,993,533 B2
(45) Date of Patent: Aug. 9, 2011

(54) METHOD FOR REGENERATING AN AUXILIARY FILTERING AGENT

(75) Inventors: Helmut Meffert, Bobenheim am Berg (DE); Marianna Pierobon, Ludwigshafen (DE); Tobias Petsch, Mörschied (DE); Julia Brodersen, Hamburg (DE); Hermann Josef Feise, Kleinniedesheim (DE); Ates Erk, Karlsruhe (DE); Jörg Kreβ, Mannheim (DE); Ralf Mar, Hochspeyer (DE); Robert Bayer, Sinsheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/443,586

(22) PCT Filed: Sep. 27, 2007

(86) PCT No.: PCT/EP2007/060279
§ 371 (c)(1),
(2), (4) Date: May 28, 2009

(87) PCT Pub. No.: WO2008/037777
PCT Pub. Date: Apr. 3, 2008

(65) Prior Publication Data
US 2009/0291164 A1    Nov. 26, 2009

(30) Foreign Application Priority Data

Sep. 29, 2006   (EP) .................................... 06121563
May 25, 2007   (EP) .................................... 07108932

(51) Int. Cl.
*B01D 37/02*   (2006.01)

(52) U.S. Cl. ........ 210/797; 210/777; 210/791; 210/792; 210/193

(58) Field of Classification Search ........................ None
See application file for complete search history.

(56) References Cited

U.S. PATENT DOCUMENTS

| | | | |
|---|---|---|---|
| 5,484,620 A | 1/1996 | Oechsle et al. | |
| 5,801,051 A | 9/1998 | Kiefer et al. | |
| 6,117,459 A | 9/2000 | Van Den Eynde et al. | |
| 2003/0059869 A1 | 3/2003 | Xia et al. | |
| 2004/0094486 A1* | 5/2004 | Drohmann et al. | 210/777 |
| 2005/0051502 A1 | 3/2005 | Gottkehaskamp | |
| 2005/0145579 A1* | 7/2005 | Drohmann et al. | 210/777 |
| 2009/0291164 A1* | 11/2009 | Meffert et al. | 426/12 |

FOREIGN PATENT DOCUMENTS

| | | |
|---|---|---|
| DE | 19625481 A1 | 1/1998 |
| DE | 19652499 A1 | 6/1998 |
| EP | 0253233 A2 | 1/1988 |

(Continued)

OTHER PUBLICATIONS

Verfahrenstechnik, Filtration, GTM Mar. 2006, pp. 44-49.

*Primary Examiner* — Robert James Popovics
(74) *Attorney, Agent, or Firm* — Connolly Bove Lodge & Hutz LLP (57) ABSTRACT

Processes comprising: (i) providing a filter aid comprising a co-extrudate of a water-insoluble polyvinylpyrrolidone and a thermoplastic polymer, (ii) treating the filter aid with aqueous alkali; (iii) subsequently treating the filter aid with an enzyme; and (iv) subsequently thereto carrying out a second treatment with aqueous alkali, to provide a regenerated filter aid, and uses therefor.

16 Claims, 8 Drawing Sheets

Filter resistances (gray) and washing resistances (hatched) as a function of the number of regenerations

FOREIGN PATENT DOCUMENTS

| | | |
|---|---|---|
| EP | 0525166 B1 | 8/1995 |
| EP | 0879629 A1 | 11/1998 |
| EP | 0611249 B1 | 9/1999 |
| EP | 1338321 A1 | 8/2003 |
| GB | 2288608 A | 10/1995 |
| WO | WO-92/11085 A1 | 7/1992 |
| WO | WO-96/35497 A1 | 11/1996 |
| WO | WO-02/32544 A1 | 4/2002 |
| WO | WO-03/008067 A1 | 1/2003 |
| WO | WO-03/084639 A2 | 10/2003 |
| WO | WO 2008037777 A1 * | 4/2008 |

* cited by examiner

Filter resistances (gray) and washing resistances (hatched) as a function of the number of regenerations

FIG. 6

FIG. 7

Haze-normalized pressure difference as a function of the filtration time (normalization to 30 EBC (25°C)); cycle numbers: ♦-1, ■-2, ×-3, ▲-4, △-5, □-6, ◇-7, +-8

FIG. 8

METHOD FOR REGENERATING AN AUXILIARY FILTERING AGENT

CROSS-REFERENCE TO RELATED APPLICATIONS

This application is a national stage application, under 35 U.S.C. §371, of PCT/EP2007/060279, filed Sep. 27, 2007, which claims benefit of European Patent Application No. 07108932.0, filed May 25, 2007, and European Patent Application No. 06121563.8, filed Sep. 29, 2006.

BACKGROUND OF THE INVENTION

Filter aids are taken to mean additives which are used in solid-liquid separation processes in order, by formation of a porous precoat layer on the actual filter medium and/or by incorporation into the filter cake framework, to ensure separation of the solids with simultaneously sufficient permeability of the resultant filter cake.

As filter aids, use is made of both inorganic substances such as, for example, kieselguhr or aluminum oxides, or else synthetic polymers. Which individual filter aids are used depends on the field of application. In the filtration of beer, kieselguhr is one of the filter aids principally used.

For economic reasons it is advantageous when the filter aid can be regenerated. A regeneration over a plurality of cycles is particularly advantageous.

WO 02/32544 describes coextrudates of polystyrene and water-insoluble polyvinylpyrrolidone and use thereof as regenerable filter aids, but the regenerability is only mentioned quite in general.

WO 03/084639 describes coextrudates of thermoplastic polymers, apart from polystyrene, and water-insoluble polyvinylpyrrolidone and use thereof as regenerable filter aids, but the regenerability is only mentioned quite in general.

WO 92/11085 describes filter aids based on agglomerates of crosslinked polyvinylpyrrolidone and fibrous thermoplastic polymers such as, for example, polyethylenes or polyamides, and use thereof as filter aids. It is noted quite in general terms that the filter aids are regenerable.

EP-A 611249 describes a process for regenerating a filter aid by addition of enzymes. Only the treatment of kieselguhr is described specifically.

EP-A 253 233 describes the regeneration of kieselguhr by means of sodium hydroxide solution.

DE 19625481 describes the regeneration of kieselguhr in the presence of a mixture of nonionic surfactants.

DE 196 52 499 describes the regeneration of filter aids of kieselguhr, the filter aids first being treated with enzyme solutions and thereafter first with weak alkalis, then with weak acids, and finally with an oxidizing agent.

WO 03/008067 describes the regeneration of filter aids, first flushing with hydroxide solution on the intact filter cake and subsequently, also on the intact filter cake, a neutralization of the pH by flushing with acid being performed. WO 96/35497 discloses regeneration of filter aids made of synthetic polymers by washing with sodium hydroxide solution and washing with an enzymatic compound, the treatment being performed in situ in the filter unit on the intact filter cake. What is described is especially the regeneration of a polyamide filter aid.

However, it has been found that the previously known processes for the filter aids to be treated according to the invention do not give satisfactory results. Using these processes, satisfactory regeneration of the coextrudate over a plurality of cycles is not possible, and the good filtration properties of the fresh filter aid with respect to pressure rise during filtration and also the filter and wash resistances in the regenerated material are not retained.

Customarily, filter resistances and washing resistances which exceed a certain value, depending on technical field of application and filter aid, are not considered acceptable in practice, since otherwise they provoke excessively high rates of pressure increase during the beer filtration, which results in uneconomically short filtration times. In the case of beer filtration, for example the filter resistances and washing resistances for the filter aid to be treated according to the invention should as far as possible not exceed a value of $10 \times 10^{12}$ mPas/m².

Filter resistance is the product of fluid viscosity and resistance to flow during the buildup of filter cake, and washing resistance is the product of fluid viscosity and resistance to flow on flow through the filter cake which is already built up. Determination of the corresponding measured values is known to those skilled in the art and is extensively described in VDI Guideline 2762.

BRIEF SUMMARY OF THE INVENTION

The present invention relates to a process for regenerating a filter aid which is a co-extrudate of a water-insoluble polyvinylpyrrolidone and a thermoplastic polymer by treatment with aqueous alkali and with the use of enzymes. The invention further relates to regenerated materials which are obtained with the aid of the process according to the invention, and also use thereof in the filtration of beer.

It was an object of the invention to find a process for regenerating the abovementioned filter aid, which process enables repeated use of the filter aid at economical values of filtrate throughput and filter life and also sufficient clarification action, and also the provision of a corresponding regenerated material. In addition there was the problem of finding a process in which breakdown of the polymeric components does not occur.

Accordingly, a process was found for regenerating a filter aid which is a coextrudate of a water-insoluble polyvinylpyrrolidone and of a thermoplastic polymer by treatment with aqueous alkali and enzymes, which comprises first subjecting the filter aid to a treatment with aqueous alkali and subsequently performing a treatment with an enzyme solution, subsequently thereto carrying out a further treatment with aqueous alkali and if appropriate a treatment with a surfactant.

The process is preferably carried out in such a manner that the enzyme treatment is not carried out in situ on the intact filter cake, but that the filter cake is removed whilst destroying the particle composite and is treated outside the filter unit.

According to the invention, the pressure-resistant vessel and the filter element situated therein in which the filtration takes place are termed the filter unit. As filter elements, all known devices therefor such as, for example, filter candles or disk filters can be present.

The regeneration process according to the invention is suitable as described for filter aids which are obtained as coextrudates of water-insoluble polyvinylpyrrolidone and a thermoplastic polymer.

DETAILED DESCRIPTION OF THE INVENTION

Mixtures of chemically different polymers which are obtained by joint processing of the individual components in the extruder are termed coextrudates, with the coextrudates not being able to be fractionated into the individual components by physical methods. In the case of the present invention, the coextrudates preferably comprise a thermoplastic polystyrene component and a non-thermoplastic water-insoluble crosslinked polyvinylpyrrolidone. In the co-extrusion, the polyvinylpyrrolidone component is dispersed in the molten thermoplastic. In addition to polystyrene, suitable thermoplastics are, for example, polyethylene, polypropylene or polyamides.

As polystyrene component, all current polystyrene types come into consideration, such as standard polystyrene, impact-modified polystyrene (SB types) such as copolymers of styrene and butadiene, or high impact-modified polystyrene (HIPS types), for example polystyrene modified by polybutadiene rubber or styrene-butadiene rubber. Such polystyrenes are commercially available, for example as PS 158 k, PS 486 M or Styrolux® (BASF) or Empera 153F (Nova Innovene) or Edistir® N2987, Edistir® N1782 (Polimeri Europa). In addition, anionically polymerized polystyrene can be used.

According to the invention, the coextrudates, in addition to the polystyrene component, as second polymer component comprise water-insoluble crosslinked polyvinylpyrrolidone polymers which are not gel-forming on water absorption and are also termed in the literature popcorn polymers (cf. J. W. Breitenbach, Chimia, Vol. 21, pp. 449-488, 1976). In pharmacopeias such as USP or Ph. Eur., such polymers are called crospovidones. Such polymers have a porous structure and are rich in cavities. The polymers are also, as stated, not gel-forming on water absorption. The swelling volume of such polymers in water at 20° C. is customarily in the range from 2 to 10 l/kg, preferably 4 to 8 l/kg.

Such crospovidones are commercially available, for example as Divergan® types from BASF or as Polyplasdone® types, from ISP.

The coextrudates can comprise 95 to 20% by weight, preferably 75 to 60% by weight, polystyrene and 5 to 80% by weight, preferably 25 to 40% by weight, crospovidone, based on the total weight of the coextrudate.

Production of the coextrudates to be treated according to the invention is known per se and is described, for example in WO 02/32544 or WO 03/084639.

The coextrudates, for use as filter aids, are customarily adjusted by milling processes to mean particle sizes of 20 to 100 μm. Mixtures of milled coextrudates having different particle size distributions can also be used.

As water-insoluble polyvinylpyrrolidone, in particular a crosslinked homopolymer of N-vinylpyrrolidone comes into consideration, which is also called crospovidone. Such products are commercially available.

Suitable thermoplastic polymers are, for example, polystyrene types, polyamides, polyolefins such as polyethylene or polypropylene. Preferably, as thermoplastic polymers, use is made of polystyrene.

The process according to the invention is carried out in such a manner that the filter aid loaded with impurities is first subjected to a treatment with an aqueous alkali. Suitable aqueous alkalis are, especially sodium hydroxide solution or potassium hydroxide solution, particularly preferably sodium hydroxide solution. The concentration is customarily 0.5 to 5% by weight solid base/l in particular 1 to 5% by weight, particularly preferably 2 to 3.5% by weight The treatment time depends on the amount of the filter aid to be treated. The treatment time Is customarily from 15 to 180 minutes, preferably from 45 to 120 minutes The treatment with an aqueous alkali is followed by an enzymatic treatment of the filter aid. It can also be advisable, between the first treatment step with an alkali and the enzymatic treatment, to perform a washing step using cold or hot water or a suitable acid. Suitable acids are mineral acids such as, for example, hydrochloric acid, nitric acid or phosphoric acid or else organic acids such as citric acid, lactic acid and carbonic acid. According to a preferred embodiment of the invention, a washing step is compulsory.

Before the treatment with an enzyme, the pH is customarily adjusted to values<pH 7, preferably to pH 3.5 to 5.5.

The pH can be adjusted, for example using mineral acids such as phosphoric acid, nitric acid, sulfuric acid or, in the case of glass apparatuses, also with hydrochloric acid. In addition, citric acid or lactic acid is suitable.

Suitable enzymes are in principle proteases, glucosidases, amylases or pectinases and all other enzymes which are able to lyse yeast cells, or else mixtures of enzymes. Such enzymes or enzyme mixtures are commercially available.

Suitable enzymes are preferably glucanases, particularly preferably β-1,3-glucanases. In addition to a B-glucanase activity, further enzyme activities may also be present in the enzyme solution used in accordance with the invention.

Use is customarily made of the enzymes in the form of aqueous solutions.

The suitable amount of enzyme depends on the activity of the respective enzyme and the loading of the unfiltered slurry and the filter cake with impurities.

The activity can be determined by those skilled in the art by a few simple experiments by studying what amount of enzyme is required in order to lyse a defined number of yeast cells. Then, the dosage can proceed as a function of the haze or loading with yeast cells and of the volume of unfiltered slurry to be filtered.

The enzyme treatment can be performed at 25-80° C., preferably 35-60° C., most preferably 40-50° C. The time depends on the amount of filter aid and loading with yeast cells. The time is customarily from 30 to 300 minutes, preferably from 100 to 180 minutes.

The active units can be determined as described below:

One active unit U is defined according to the invention as the decrease in extinction at 800 nm by 0.04/min in an enzyme assay at pH 4.0 and 45° C. within the first 10 min. As substrate in this assay, use can be made of brewer's yeast having 1-3× $10^7$ cells/ml which has been treated in advance with sodium hydroxide solution.

Based on the EBC value of the unfiltered slurry at 25° C. and also the filtered volume and with consideration of the above described active units, a recommended dosage is of 0.2 U/(EBC×hL) to 12 U/(EBC×hL), preferably 1 to 5 U/(EBC×hL).

(EBC: European Brewery Convention; standard test for determination of haze values.)

With respect to the yeast cell count in the filter cake to be regenerated, a dosage of 3 to 170 U/$10^{10}$ yeast cells is advisable, preferably 5 to 85 U/$10^{10}$ yeast cells, In particular 5 to 20 U/$10^{10}$ yeast cells.

Subsequently to the enzymatic treatment, a second treatment step with an aqueous alkali proceeds under the conditions described for the first treatment step with an alkali. Between the enzymatic treatment and the alkali treatment, if desired, again a washing step with cold or hot water can proceed.

If desired, the filter aid can also be treated with an aqueous surfactant solution or surfactant dispersion. The concentration of surfactant, based on the total weight of the solution, can be 0.01 to 4% by weight, preferably 0.01 to 1.5% by weight, most preferably 0.1 to 0.75% by weight. Suitable surfactants are both anionic and nonionic surfactants. Mixtures of surfactants can also be used.

Suitable ionic surfactants can be the following: fatty alcohol sulfates such as sodium dodecyl sulfate or ammonium dodecyl sulfate, fatty alcohol ether sulfates, alkyl sulfoacetates, fatty alcohol esters of phosphoric acid, fatty alcohol ether phosphates, alcohol esters of phosphoric acid such as trisobutyl phosphate, monoalkyl or dialkyl esters of sulfosuccinic acid such as dioctyl sodium sulfosuccinate, alkyl sulfonates, alkylbenzenesulfonates such as dodecylbenzenesulfonic acid.

Nonionic surfactants which come into consideration are: fatty alcohol ethoxylates such as, for example, a $C_{13}$-fatty alcohol having 6 EO units, alkylphenolethoxylates, polyoxyethylene esters of fatty acids, polypropylene glycol ethoxylates, fatty acid mono- and di-glycerides and also the corresponding ethoxylates, partial glycol esters of fatty acids, sorbitan esters of fatty acids or polyoxyethylenesorbitan esters of fatty acids.

The treatment with the surfactant can be performed simultaneously with the second treatment step with aqueous alkali, or In a downstream treatment step. The surfactant treatment can also be performed before the second treatment step with aqueous alkali.

The treatment with aqueous surfactant Is a preferred process variant.

This treatment step can be followed by a further washing step with cold or hot water.

The process according to the invention is carried out, according to one embodiment, in such a manner that the enzymatic treatment step is not performed on an intact filter cake or a precoat layer, but In a separate device. This separate device can be, for example, a kettle or other suitable vessel, and is preferably fitted with an agitator device. However, the treatment may also be performed on the filter, if appropriate.

The first treatment step with aqueous alkali, according to a process variant, can proceed on the intact filter cake. Before the enzymatic treatment, the filter aid is then removed from the filter element with dispersion of the particle composite in the filter cake, removed from the filtration unit and treated in a separate device. The enzymatic treatment is performed on an aqueous suspension or slurry of the filter aid which customarily has a solids content of 5 to 25% by weight.

According to another process variant, the first treatment with aqueous alkali can also be performed on a filter cake removed from the filter unit whose particle composite has been disintegrated and which is an aqueous slurry or suspension.

After the enzymatic treatment, the second treatment step with aqueous alkali can likewise be performed, if appropriate, in the presence of surfactants, on the aqueous slurry or suspension of the filter aid. According to a process variant, the filter aid, however, is applied as precoat in a suitable filter and the newly formed filter cake is subjected to the further treatment steps.

The regeneration steps which are performed by flowing through the intact filter cake can be carried out at all pressure differences between the feed side and the filtrate side of the filter which, on the one hand, allow flow through the filter cake and, on the other hand, do not exceed the pressure resistance of the filter housing. This pressure difference is customarily between 1 kPA and 800 kPa.

The enzymatic treatment, and also if appropriate the first and/or the second treatment step with an alkali, and also the surfactant treatment in the separate device, are customarily performed at atmospheric pressure. It is also conceivable for at least one of the steps to be carried out at overpressure.

The temperature of the aqueous alkalis used for the regeneration can be 5 to 95° C., preferably 45 to 95° C. just like the aqueous surfactants.

The completely regenerated filter aid can remain in the filter unit and be used immediately for filtration. The regenerated filter aid, however, can alternatively be removed from the unit, dried and stored.

By means of the process according to the invention, successful regeneration of the coextrudate over a plurality of cycles is possible, the good filtration properties of the fresh filter aid with respect to pressure rise during filtration and also the filtration and washing resistances in the regenerate being very largely retained.

Those skilled in the art, depending on beer type and yeast load, can add fresh filter aid to the initial precoat or continuous metered addition.

The process according to the invention is suitable for regenerating filter aids for any type of precoat filters having a precoat layer deposited on filter elements.

The regeneration process according to the invention is suitable, in particular, for use in beer filtration.

The main assessment feature of the regeneration is the pressure rise with time. (pressure difference between feed side and filtrate side of the filter) in beer filtration following regeneration. An excessive pressure rise or an increase in the pressure rise rate from experiment to experiment indicates incomplete regeneration of the filter aid.

An approximately constant pressure rise rate from experiment to experiment, which is in the range of that of the fresh product, indicates complete regeneration. The haze load in the unfiltered slurry customarily fluctuates and has a considerable effect on the pressure rise rate. This effect can be virtually eliminated by normalizing the pressure difference using the respective (likewise normalized to a standard value) unfiltered haze (25°-EBC). The haze normalized pressure can be calculated in this case by dividing the measured pressure by the quotient of the actual unfiltered haze and a standard haze of 30 EBC (25°-EBC).

A further criterion for evaluating the successful regeneration is the filter resistance or washing resistance of the regenerated material. If these values are significantly increased compared with the fresh product and demonstrate an increase from cycle to cycle, likewise incomplete regeneration must be assumed.

EXAMPLES

In the examples hereinafter, as filter aid, use was made of a coextrudate of 70% by weight polystyrene PS 158K and 30% by weight crospovidone, based on the total amount of coextrudate. It was a mixture of two milling fractions having mean particle sizes D [0.5] 54 μm (45% by weight) and D [0.5] 28 μm (55% by weight).

For the enzyme treatment, an aqueous solution of a 1,3-β-glucanase (Trenolin Filtro DF, Erbslöh) was used.

Beer filtration was performed, using hazy beer, as precoat filtration by means of a pilot candle filter (gap width 70 μm, filter area 0.032 m², throughput 15 l/h).

The filter resistances were determined as specified in VDI Guideline 2762.

Example 1 (Comparative Example)

Series Experiment Using 4 Filtration-Regeneration Cycles; Example of an Incomplete Regeneration Regeneration Conditions First the residual volume of beer in the unit was removed using cold drinking water.

Regeneration was performed by flushing for 15 min with hot water (85° C.), followed by flushing for 15 min with 3% strength by weight aqueous NaOH (85° C.), and renewed flushing with hot water (15 min, 85° C.). All flushing was carried out on the still-intact. filter cake.

Pressure-rise Curves: (see FIG. 1)

Figure 1:
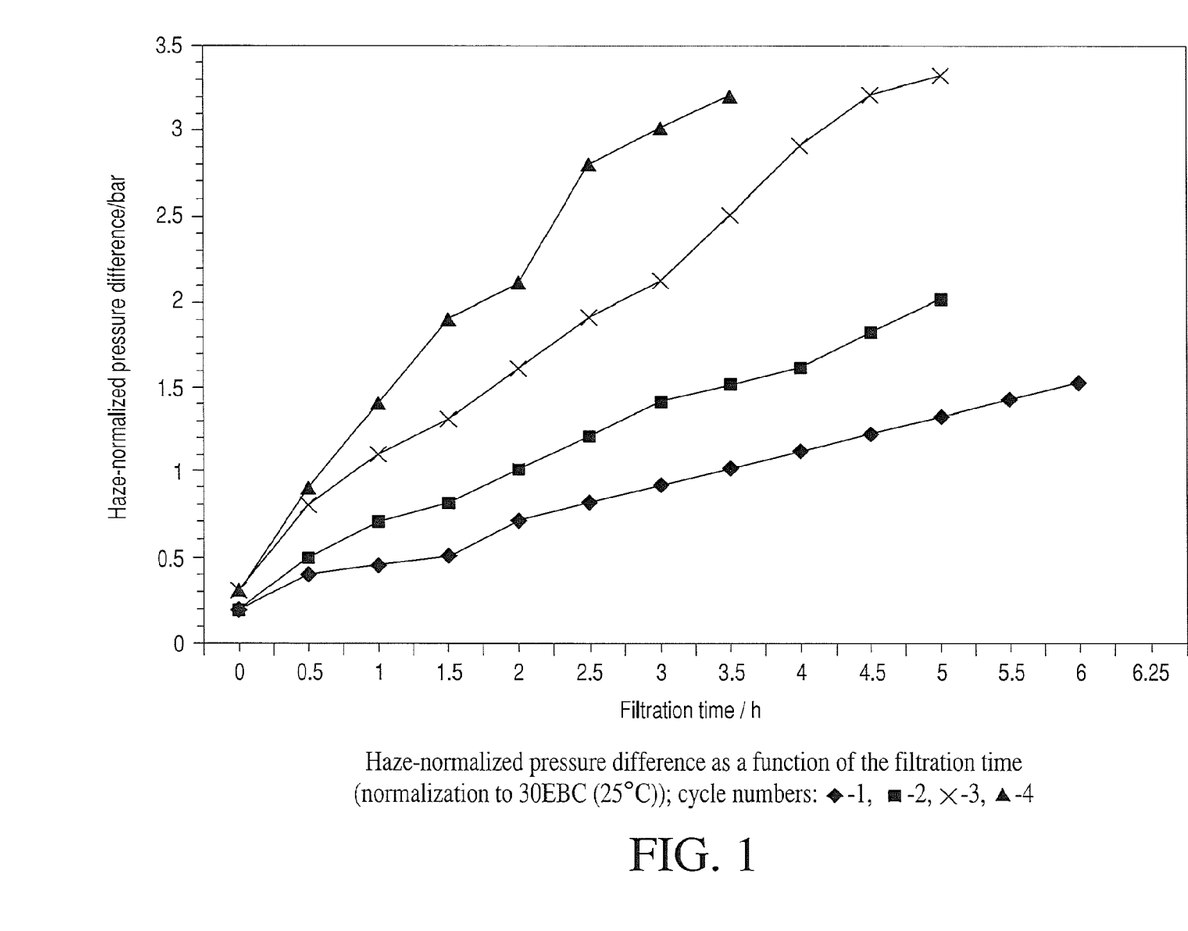

FIG. 1: Haze-normalized pressure difference as a function of the filtration time (normalization to 30 EBC (25° C.)); cycle numbers: ♦-1, ■-2, x-3, ▲-4

It may be seen that the gradient of the pressure curves increases from cycle to cycle and significantly higher pressure differences are measured than in the case of the fresh product.

Filter Resistances of the Regenerated Material: (see FIG. 2)

Figure 2:
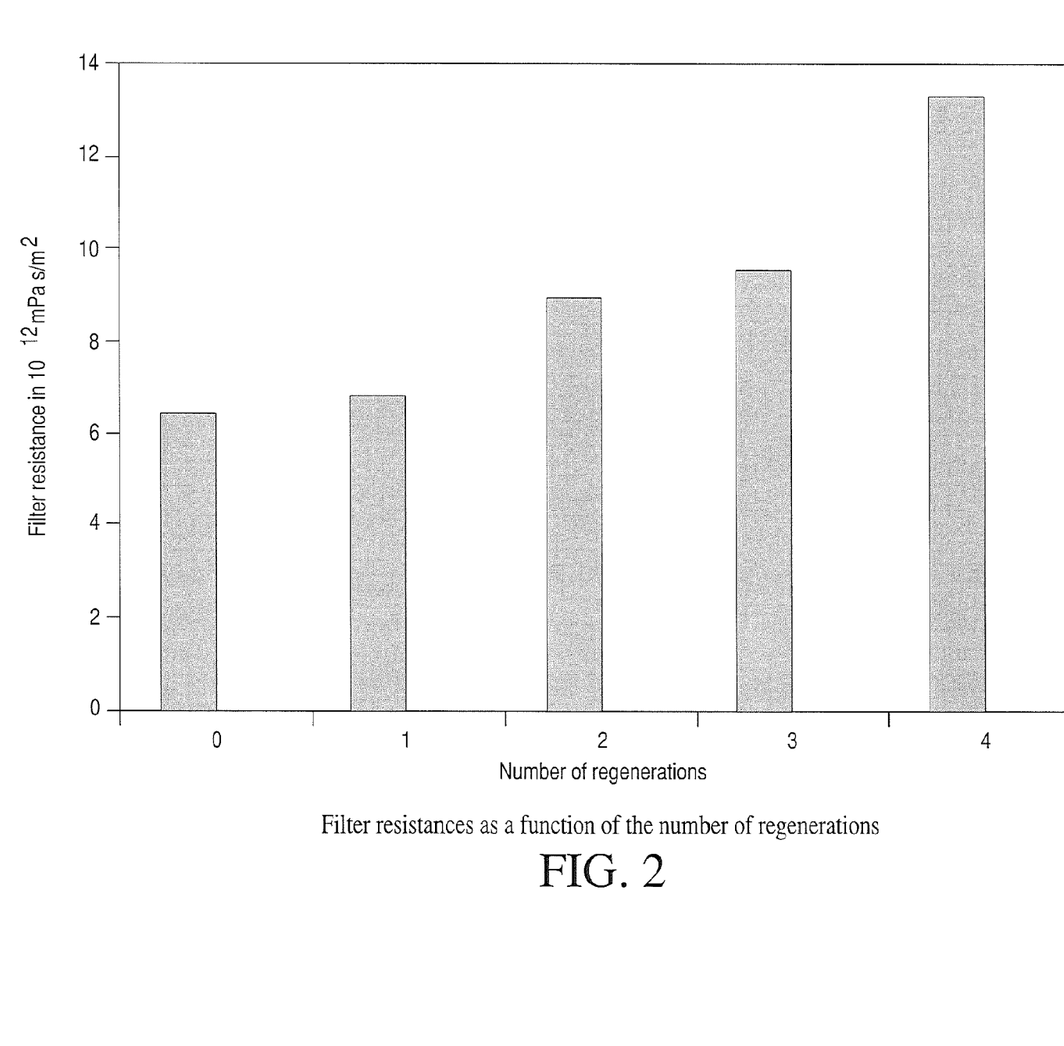

FIG. 2: Filter resistances as a function of the number of regenerations

The filter resistance of the regenerated material increases after each regeneration, which indicates the accumulation of biomass in the regenerated material.

Example 2

Series Experiment Using 10 Filtration-Regeneration Cycles, Example of a Successful Regeneration Regeneration Conditions After the end of the beer filtration, the volume of residual beer in the unit was flushed out with cold drinking water. Subsequently, hot water flushing was performed by flushing the filter cake which was still intact and situated on the filter with drinking water (85° C.) for a period of 15 min, at a throughput of 30 l/h. Subsequently, the filter cake was flushed with aqueous 2% strength by weight NaOH (85° C.) for a period of 10 min with the flushing liquid being discarded, subsequently 50 min, likewise with aqueous NaOH in a recirculation procedure, in both cases at a throughput of 15 l/h. Thereafter, cold water flushing was performed to remove the residual volume of NaOH solution in the unit and cooling by flushing with cold drinking water (5-10° C) for 15 min at 30 /h. Subsequently thereto, an enzyme treatment was performed, with the filter cake being removed before the treatment and transferred Into a stirred tank situated outside the filter unit. There a treatment with an aqueous solution of a β-1,3-glucanase was performed at pH 5 and 47° C. for 120 min. The enzyme quantity was 10.9 U/EBC×hL. After the enzyme treatment was ended, the filter aid was again applied as precoat to the filter candle via a metering device at a throughput of 30 l/h. Thereafter the resultant filter cake was flushed with an aqueous solution comprising NaOH and Na-dodecyl sulfate (SDS) (1% strength by weight NaOH, 2% strength by weight SDS) at a flushing solution temperature of 85° C., for 15 min with the flushing liquid being discarded, 10 min in recirculation procedure, at a throughput of 15 l/h. This was followed by hot water flushing of the filter cake with drinking water at 85° C. for 15 min at a throughput of 30 l/h, and thereafter a flushing with cold drinking water (5-10° C.) for 15 min at 30 l/h.

Figure 3:
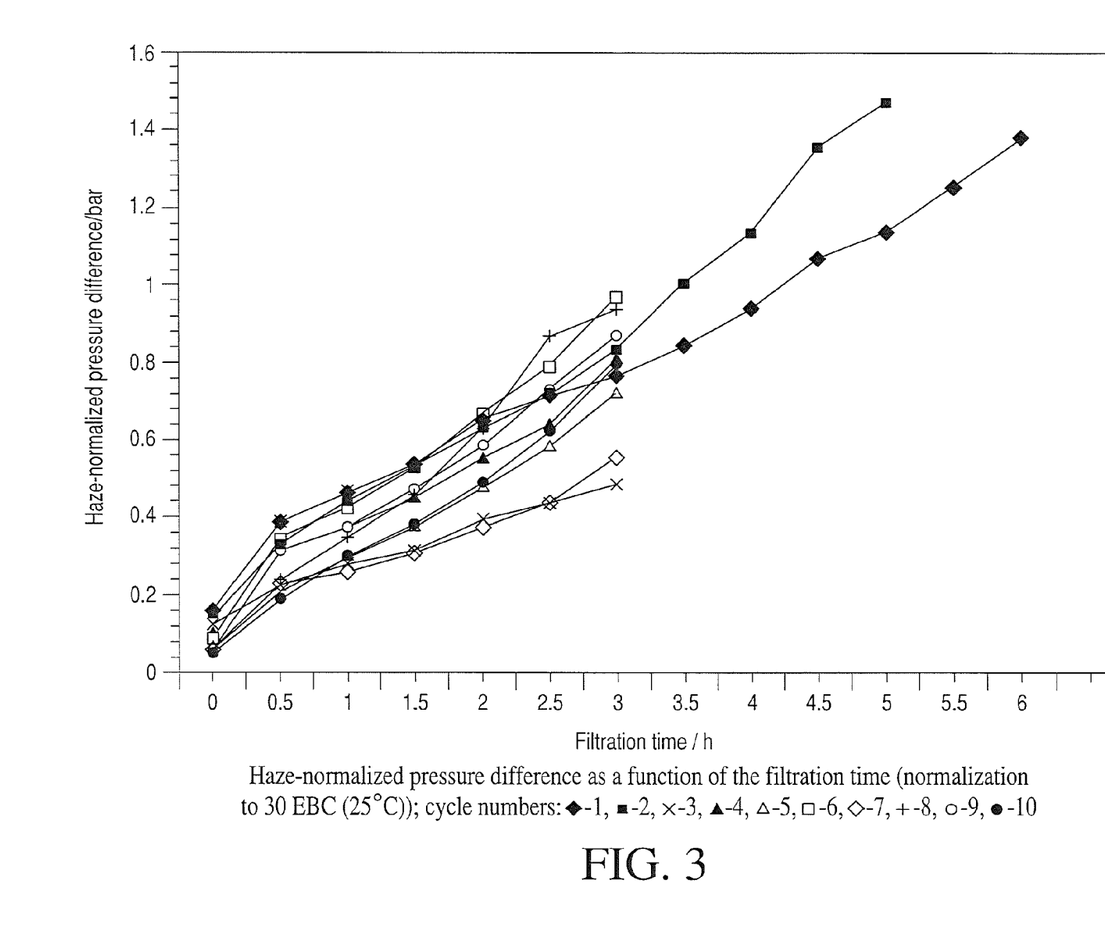

The pressure rise curves may be seen in FIG. 3.

FIG. 3: Haze-normalized pressure difference as a function of the filtration time (normalization to 30 EBC (25° C.)); cycle numbers: ♦-1, ■-2, x-3, ▲-4, Δ-5, □-6, ◊-7, +-8, o-9, ●-10

The individual pressure rise curves lie in a band around that of the starting filtration using fresh product and show no systematic rise of the gradient.

Filter and washing resistances of the regenerated material:

Although the filter and washing resistances (see FIG. 4) show experiment-specific variations, they do not show a continuous rise.

Figure 4:
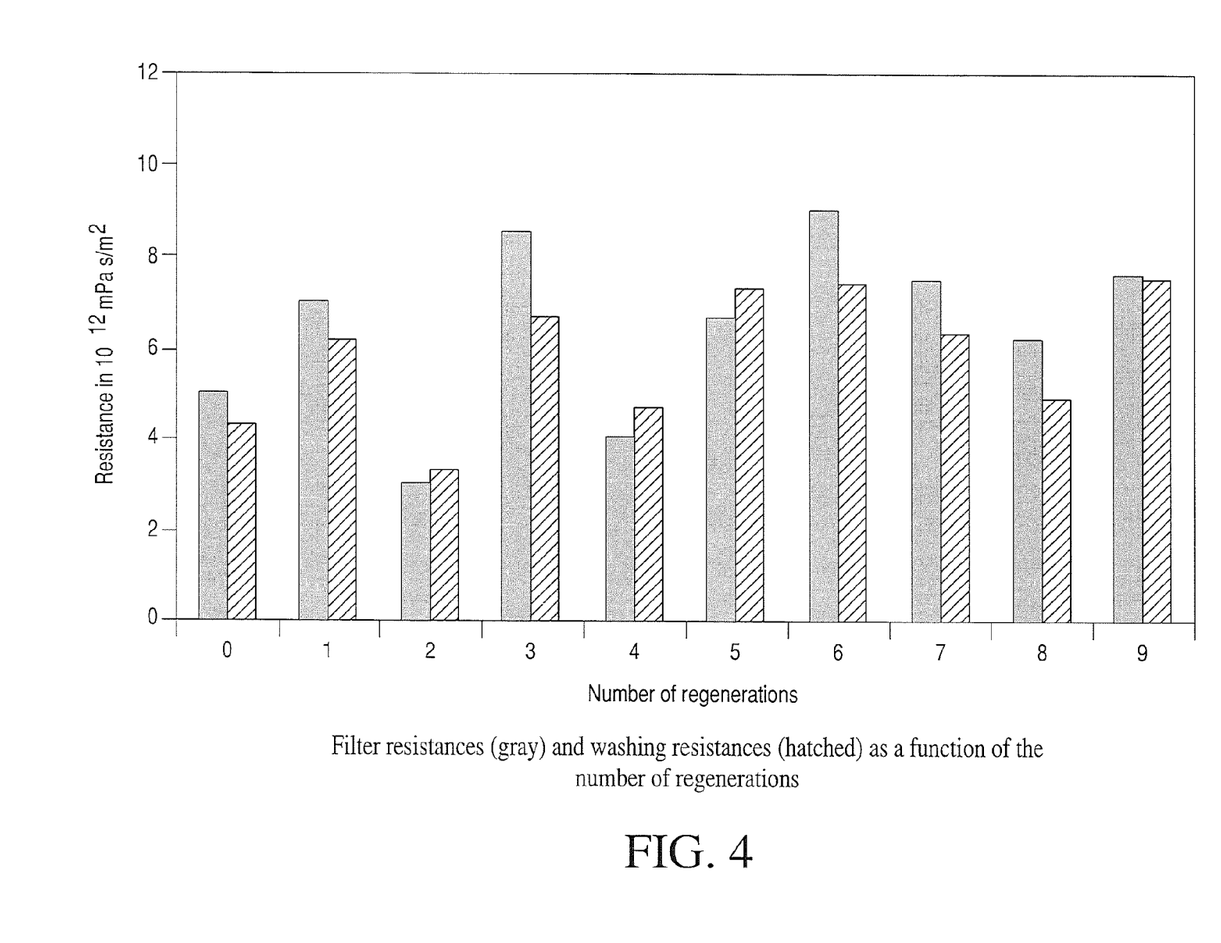

FIG. 4: Filter resistances (grey) and washing resistances (hatched) as a function of the number of regenerations

Example 3

Series Experiment Using 11 Filtration-Regeneration Cycles, Second Example of a Successful Regeneration Regeneration Conditions The regeneration was performed in a similar manner to example 2, but the enzyme concentration was, depending on cycle 1.1-2.5 U/EBC×hL.

Figure 5:
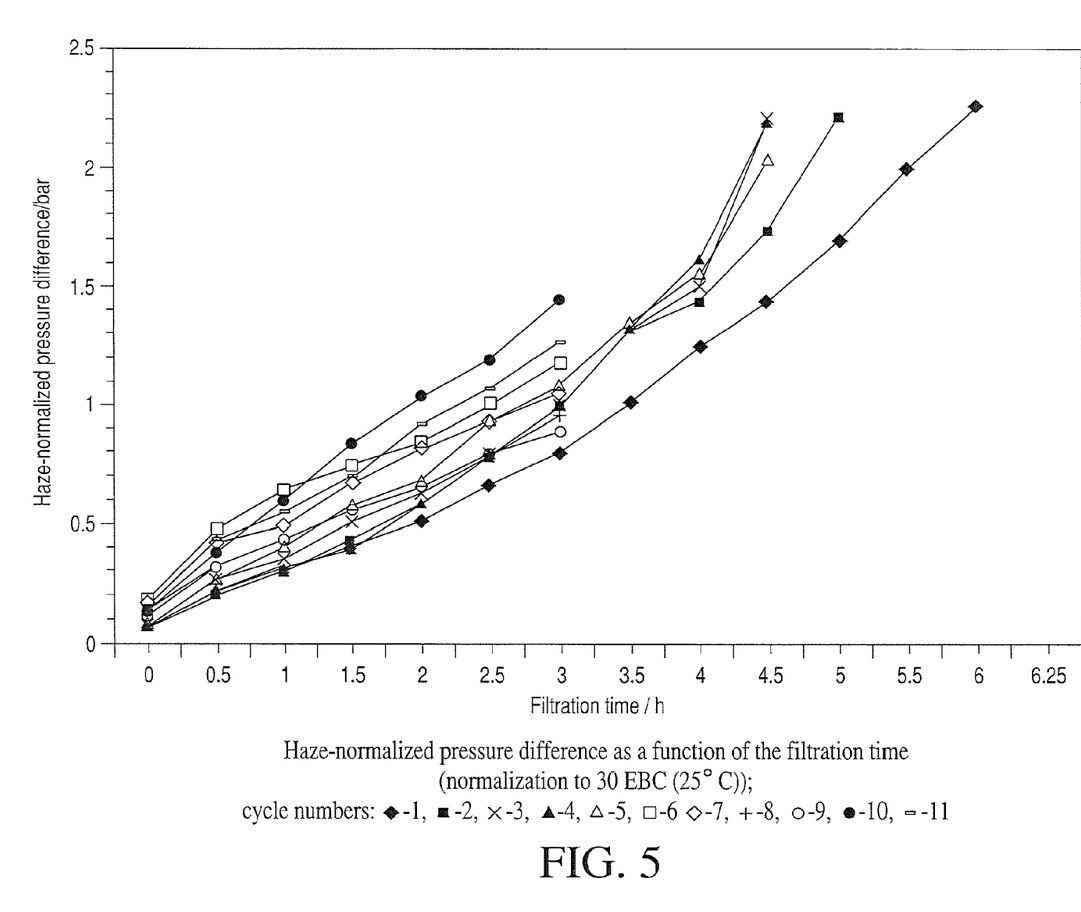

The pressure rise curves may be seen in FIG. 5.

FIG. 5: Haze-normalized pressure difference as a function of the filtration time (normalization to 30 EBC (25° C.)); cycle numbers: ♦-1, ■-2, x-3, ▲-4, Δ-5, □-6, ◊-7, +-8, o-9, ●-10, --11

Again it may be seen that there was no systematic rise with respect to the gradient of the pressure rise curves. The scattering of the experimental data is firstly caused by the differing haze of the unfiltered slurry (the normalization attenuates this only in part) and secondly by the different enzyme quantities used.

Filter and washing resistances of the regenerated material

The filter and washing resistances (see FIG. 6) show some increases compared with the fresh product, but no continuous rise as in example 1.

Figure 6:
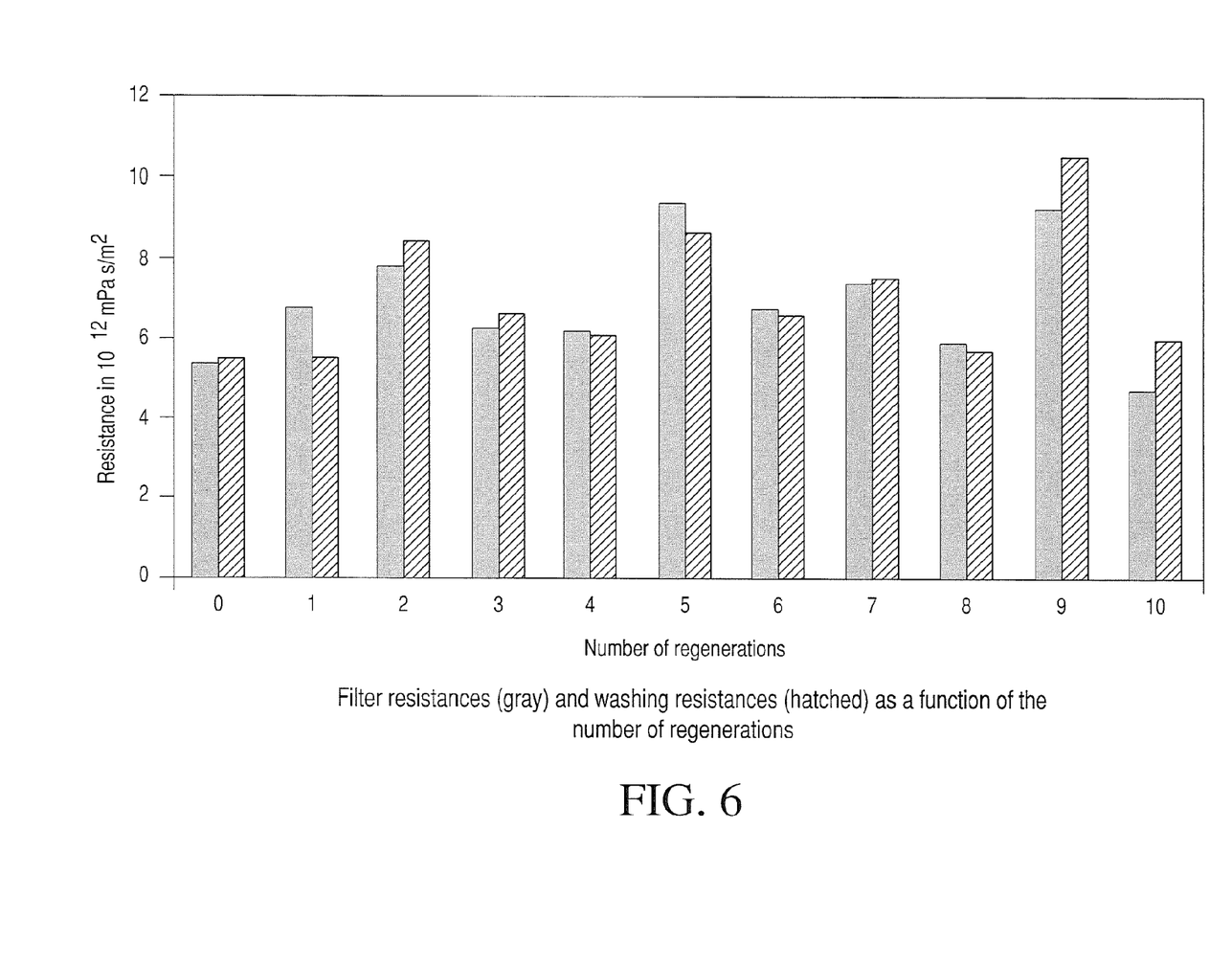

FIG. 6: Filter resistances (grey) and washing resistances (hatched) as a function of the number of regenerations

Example 4

The experimental procedure was performed substantially similarly to example 2, but with the following differences:

At the start of the regeneration, flushing was performed using aqueous sodium hydroxide solution for a time of 60 min, then 15 min with the flushing liquid being discarded, 45 min in a recirculation procedure.

The amount of enzyme used was 1.4 U/(EBC×hL).

The treatment (duration: 25 min) with an aqueous solution comprising 1% by weight NaOH and 0.5% by weight Na dodecyl sulfate, was carried out directly after the enzyme treatment outside the filter unit in a stirred tank. After this treatment the material was applied to the filter as a precoat and hot water (85° C.) flowed through the filter cake for 15 min, and subsequently cold water (5-10° C.) for 15 min at a throughput of 30 l/h.

Figure 7:
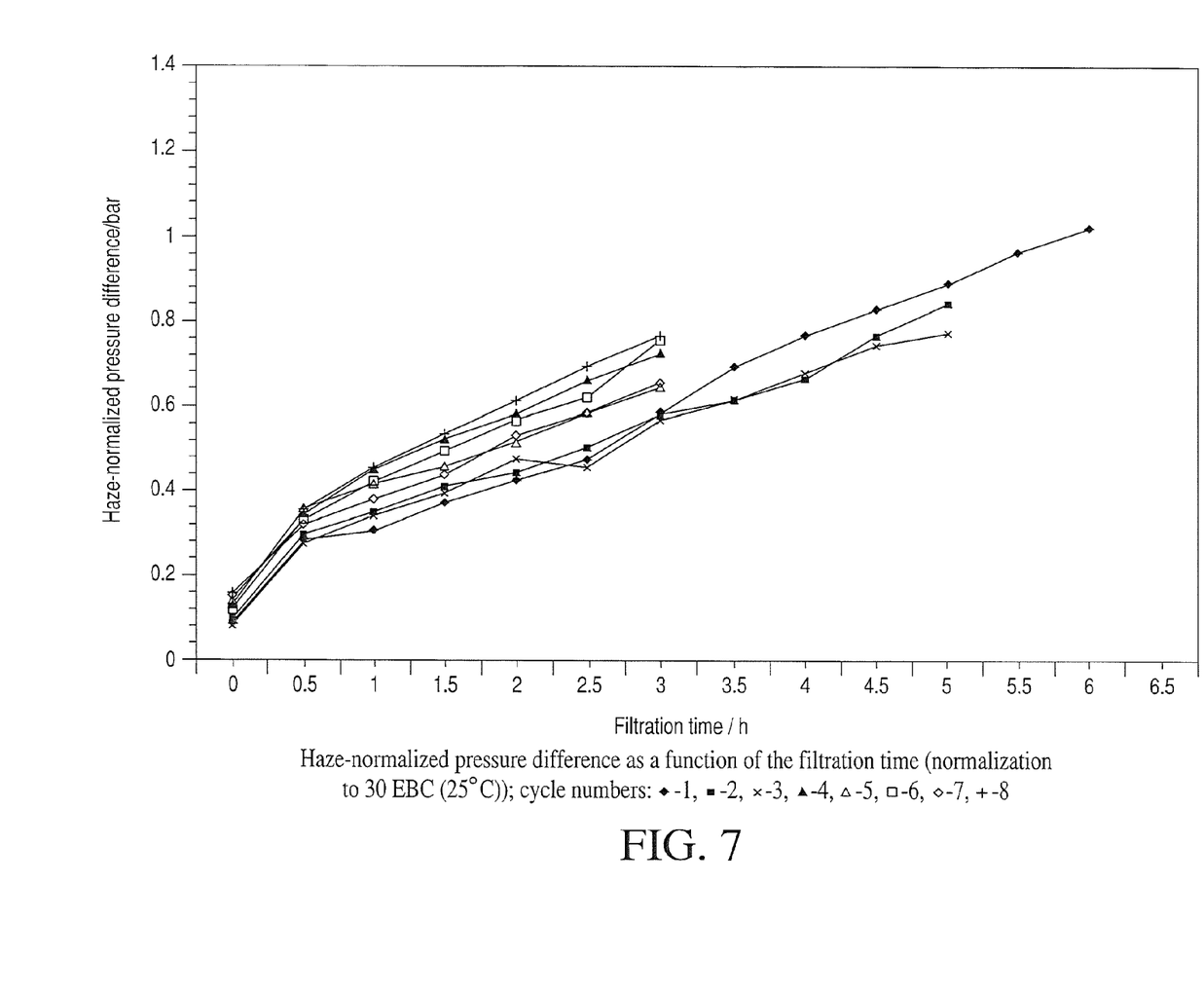
Figure 8:
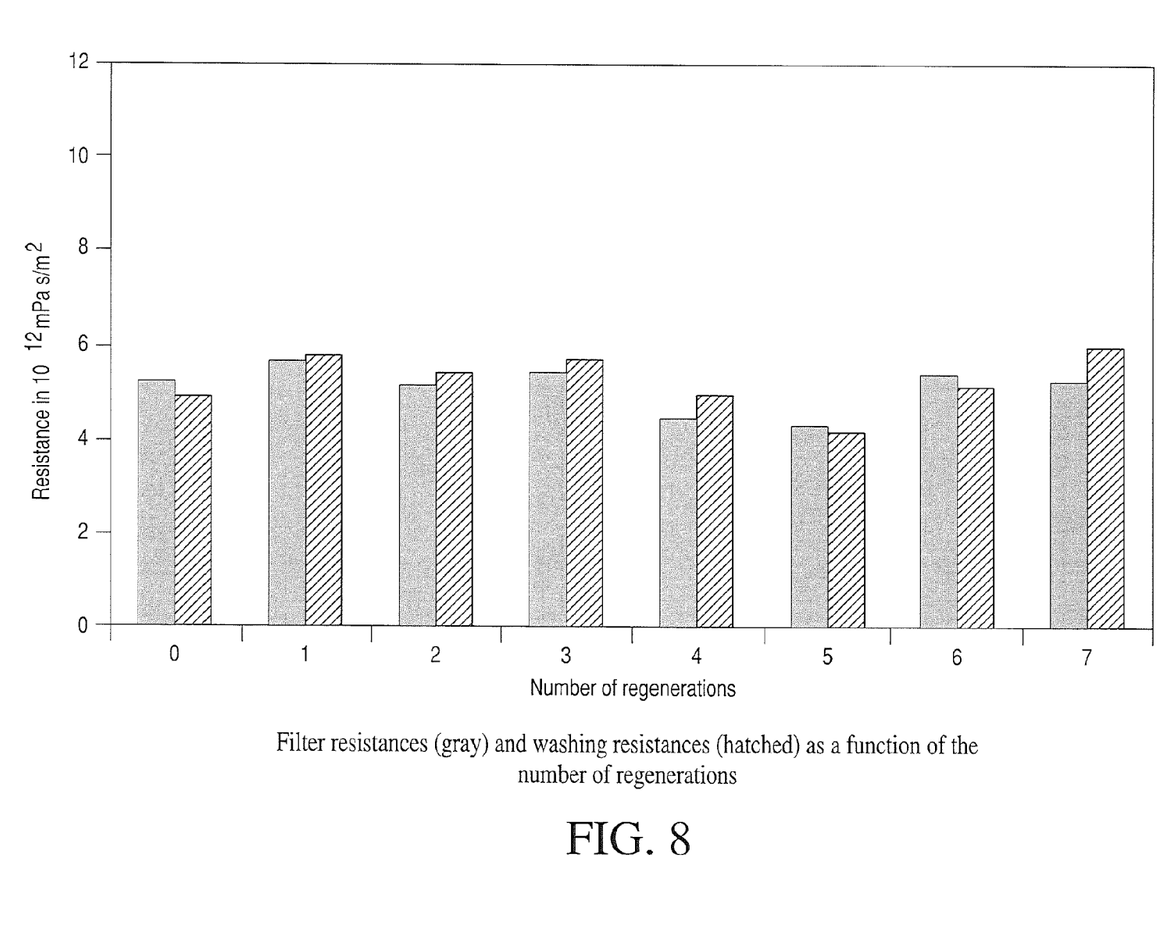

The pressure course of the filtration is shown in FIG. 7, the filter and washing resistances are shown in FIG. 8.

FIG. 7: Haze-normalized pressure difference as a function of filtration time (normalization to 30 EBC (25° C.)); cycle numbers: ♦-1, ■-2, x-3, ▲-4, Δ-5, □-6, ◊-7, +-8

FIG. 8: Filter resistances (gray) and washing resistances (hatched) as a function of the number of regenerations There is no monotonic increase in filter and washing resistances as a function of number of cycles, which means that the regeneration had been successful.

The invention claimed is:

1. A process for regeneration of a filter aid comprising a co-extrudate of a water-insoluble polyvinylpyrrolidone and a thermoplastic polymer, which process comprises:
   treating the filter aid with a first treatment of aqueous alkali;
   subsequently treating the filter aid with an enzyme; and
   subsequently treating the filter aid with a second treatment of aqueous alkali and wherein the process further comprises treating the filter aid with a surfactant.

2. The process according to claim 1, wherein the aqueous alkali comprises a sodium hydroxide solution.

3. The process according to claim 1, wherein the enzyme comprises an enzyme which lyses yeast cells.

4. The process according to claim 3, wherein the enzyme which lyses yeast cells comprises a glucanase.

5. The process according to claim 1, wherein the surfactant comprises an anionic surfactant.

6. The process according to claim 1, wherein the surfactant comprises sodium dodecyl sulfate.

7. The process according to claim 1, wherein the surfactant comprises a fatty alcohol ethoxylate.

8. The process according to claim 1, wherein the thermoplastic polymer component of the filter aid comprises polystyrene.

9. The process according to claim 1, wherein the enzyme treatment is carried out on an aqueous slurry or suspension of the filter aid.

10. The process according to claim 1, wherein the first treatment with aqueous alkali is carried out on a filter cake.

11. The process according to claim 1, wherein the first treatment with aqueous alkali is carried out on an aqueous suspension or slurry of the filter aid.

12. The process according to claim 1, wherein the second treatment with aqueous alkali is carried out on an aqueous suspension or slurry of the filter aid.

13. The process according to claim 1, wherein the second treatment with aqueous alkali is carried out on a filter cake.

14. The process of claim 1, wherein the step of treating the filter aid with a surfactant is carried out simultaneous with the second treatment of aqueous alkali.

15. The process of claim 1, wherein the step of treating the filter aid with a surfactant is carried out after the second treatment of aqueous alkali.

16. The process of claim 1, wherein the step of treating the filter aid with a surfactant is carried out before the second treatment of aqueous alkali.

* * * * *